United States Patent [19]
Chethik

[11] Patent Number: 5,237,292
[45] Date of Patent: Aug. 17, 1993

[54] QUADRATURE AMPLITUDE MODULATION SYSTEM WITH COMPENSATION FOR TRANSMISSION SYSTEM CHARACTERISTICS

[75] Inventor: Frank Chethik, Palo Alto, Calif.

[73] Assignee: Space Systems/Loral, Palo Alto, Calif.

[21] Appl. No.: 907,151

[22] Filed: Jul. 1, 1992

[51] Int. Cl.$^5$ .................................... H04L 27/36
[52] U.S. Cl. ..................... 332/103; 375/39; 375/57; 375/60; 375/67
[58] Field of Search ............ 332/103, 104, 105; 375/39, 57, 60, 67

[56] References Cited
U.S. PATENT DOCUMENTS

| | | | |
|---|---|---|---|
| 4,039,961 | 8/1977 | Ishio et al. | 329/50 |
| 4,168,397 | 9/1979 | Bradley | 178/67 |
| 4,464,767 | 8/1984 | Bremer | 375/67 |
| 4,571,549 | 2/1986 | Lods et al. | 332/16 |
| 4,804,931 | 2/1989 | Hulick | 332/31 |
| 4,930,141 | 5/1990 | Ohmagari | 332/103 X |
| 4,999,590 | 3/1991 | Verdot | 332/104 |

Primary Examiner—Siegfried H. Grimm
Attorney, Agent, or Firm—Perman & Green

[57] ABSTRACT

Digital signals are converted to phase and amplitude altered, periodic, analog signals and emplaced on an output link. The system is adaptive and includes a plurality of simple quadrature phase shift keying modulators, each modulator having a plurality of controlling digital inputs, the states of which determine which of a plurality of phase displaced signals will be outputted. A local oscillator provides a periodic sinusoidal signal to each QPSK modulator. Summing circuits combine the outputs of the modulators so as to produce a constellation of phase and amplitude-displaced output sinusoidal signals. A processor/mapper combination enables conversion of a first set of digital inputs to a different set of digital outputs in accordance with a control input. Thus, the processor enables the alteration of the constellation of outputs in accordance with a control input, which may be indicative of the condition of a transmission facility.

10 Claims, 7 Drawing Sheets

AMPLITUDE RESPONSE

PHASE RESPONSE

AM/PM

AM/AM

QUADRATURE AMPLITUDE MODULATION SYSTEM WITH COMPENSATION FOR TRANSMISSION SYSTEM CHARACTERISTICS

FIELD OF THE INVENTION

This invention relates to digital signal modulation that employs quadrature amplitude modulation and, more particularly, to a digital signal modulator that is adaptive in response to a command to alter its modulated output.

BACKGROUND OF THE INVENTION

Quadrature amplitude modulation (QAM) of transmission carriers by digital signals is a known method of digital modulation. For two phase state modulation, each bit has two reference phases, one phase for a value corresponding to one and one phase for a value corresponding to zero. The phases are shifted by 180° from each other.

In a four-phase QAM (or quadrature-phase-shift-keyer, QPSK) a carrier wave takes each of four different phase values (90° separated) depending on the values assumed by two bits. Such a four phase QAM (QPSK) is shown in FIG. 1 and includes a quadrature phase shift keying (QPSK) circuit 10. A pair of digital inputs D1 and D2 are applied to mixers 12 and 14, respectively. The output of a local oscillator 16 is applied to a 90° hybrid 18 where it is separated into sine and cosine values that are respectively applied to mixers 12 and 14. The outputs from mixers 12 and 14 are summed in a summing circuit 20 to provide an output on line 22.

While inputs D1 and D2 take the form of binary values 1 and 0 within QPSK 10, those values are converted by level shifters (not shown) to d1 and d2, which exhibit digital values of $+1$ and $-1$, respectively. In this manner, a quadrature phase output from summing circuit 20 appears in the form of $d1A\sin\omega t + d2A\cos\omega t$.

In FIG. 2, the phases emanating from summing circuit 20 are shown by an I/Q plot of phase vectors 24, 26, 28 and 30. If values d1 and d2 are $+1$ and $-1$ respectively, the output signal on line 22 lags the phase of local oscillator 16 by 45°. Similarly, if d1 and d2 are, respectively, $-1$ and $+1$, the output phase lags by 135°, etc. QPSK 10 is thus enabled to output four separate phase signals in dependence upon the values of inputs D1 and D2.

In FIG. 3, a QAM is shown that enables the generation of 16 separate phase and amplitude signals in accordance with four digital inputs D1–D4. In this instance, a pair of QPSK modulators 30 and 32 are employed, each operating identically to QPSK 10 of FIG. 1. In this case, however, the output of QPSK 32 is fed through a 6 dB attenuator 34 before being applied to summing circuit 36. The resulting output on line 38 is a vector addition of the outputs of QPSK modulators 30 and 32 and is shown in FIG. 4.

As an example, if the output from QPSK modulator 30 exhibits the phase shown by vector 40, and the output from QPSK 32 is a signal having a phase as indicated by vector 42, then the resulting signal on output line 38 exhibits a phase as shown by vector 43 to a point 44. The 16 states of the four digital inputs D1–D4 cause the generation of a "constellation" of 16 points. A vector drawn to each point illustrates the phase and amplitude of a resultant output signal in response to the indicated digital input values.

Various modifications of the above noted prior art circuits appear in the following patents. In U.S. Pat. No. 4,571,549 to Lods et al., a 16 QAM is shown that converts a train of binary data signals into 16 predetermined phase and amplitude values. In U.S. Pat. No. 4,464,767 to Bremer, multiple, synchronous, QAM transmitters are employed that respond to an input binary bit pattern to produce output signals having phase and amplitude states defined by a 64 point constellation.

U.S. Pat. Nos. 4,168,397 to Bradley and 4,804,931 to Hulick show further versions of QAM devices for producing multi-state outputs in accordance with digital signals. Bradley describes an eight-phase PSK modulator, whereas Hulick describes a multiphase quadrature system that employs a plurality of cascaded combining circuits to achieve the multiphase output. U.S. Pat. No. 4,039,961 to Ishio describes a demodulator for a 16 QAM signal wherein the reference carrier is extracted from the received signal and is regenerated for demodulation purposes.

In all of the above noted prior art, the described modulators provide regularly arrayed phase, amplitude outputs in accordance with determined digital inputs. In each instance, the phase output is predetermined by the digital input value.

It is an object of this invention to provide a QAM system that is adaptive and can be adjusted in accordance with transmission system element characteristics.

It is another object of this invention to provide a digital modulation system that is adaptive and enables adjustment of the converter's output in accordance with predetermined control inputs.

It is a further object of this invention to provide a digital modulation system having a number of output amplitude/phase states that greatly exceed the number of possible digital transmission states, thereby enabling amplitude/phase states to be selectively chosen to compensate for non-linear and/or time dispersive elements of a transmission system.

SUMMARY OF THE INVENTION

Digital signals are converted to phase and amplitude altered, periodic, analog signals and emplaced on an output link. The system is adaptive and includes a plurality of simple quadrature phase shift keying modulators, each modulator having a plurality of controlling digital inputs, the state of which determines which of a plurality of phase displaced signals will be outputted. A local oscillator provides a periodic sinusoidal signal to each QPSK modulator. Summing circuits combine the outputs of the modulators so as to produce a constellation of phase and amplitude-displaced output sinusoidal signals. A processor/mapper combination enables conversion of a first set of digital inputs to a different set of digital outputs in accordance with a control input. Thus, the processor enables the alteration of the constellation of outputs in accordance with a control input, which may be indicative of the condition of a transmission facility.

DETAILED DESCRIPTION OF THE INVENTION

Figure 1:
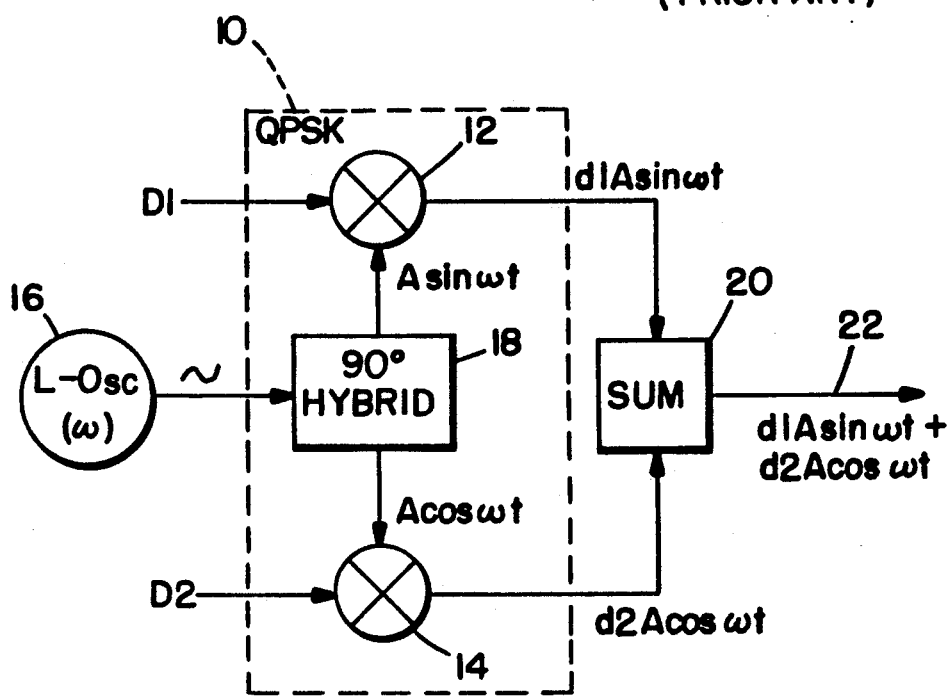
FIG. 1 is a block diagram of a prior art phase shift keying modulator.
Figure 2:
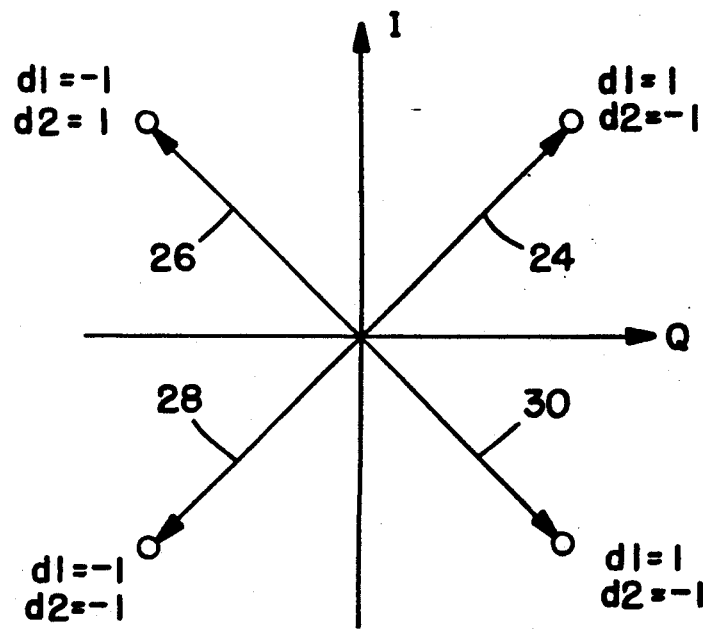
FIG. 2 is a vector diagram illustrating the four phase vectors which result at the output from the circuit of FIG. 1.
Figure 3:
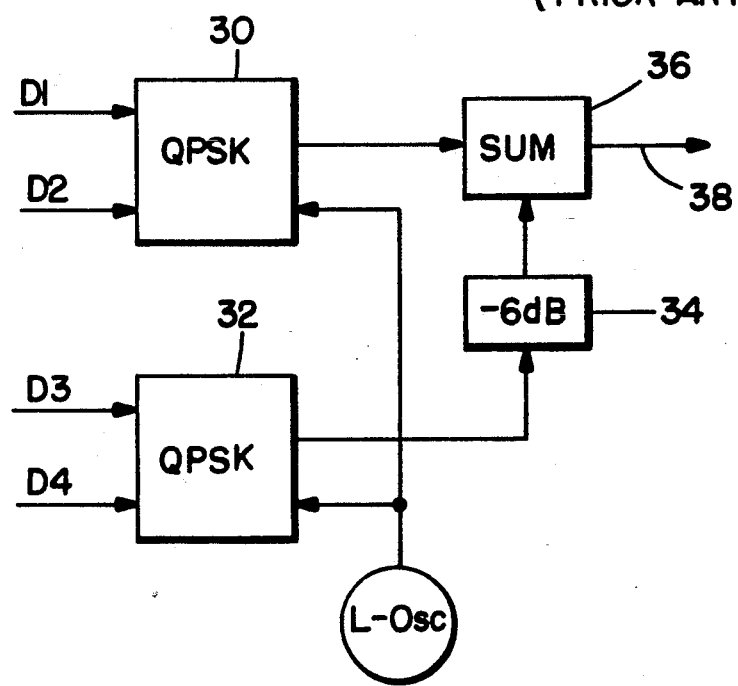
FIG. 3 is a block diagram of a 16 QAM circuit found in the prior art.
Figure 4:
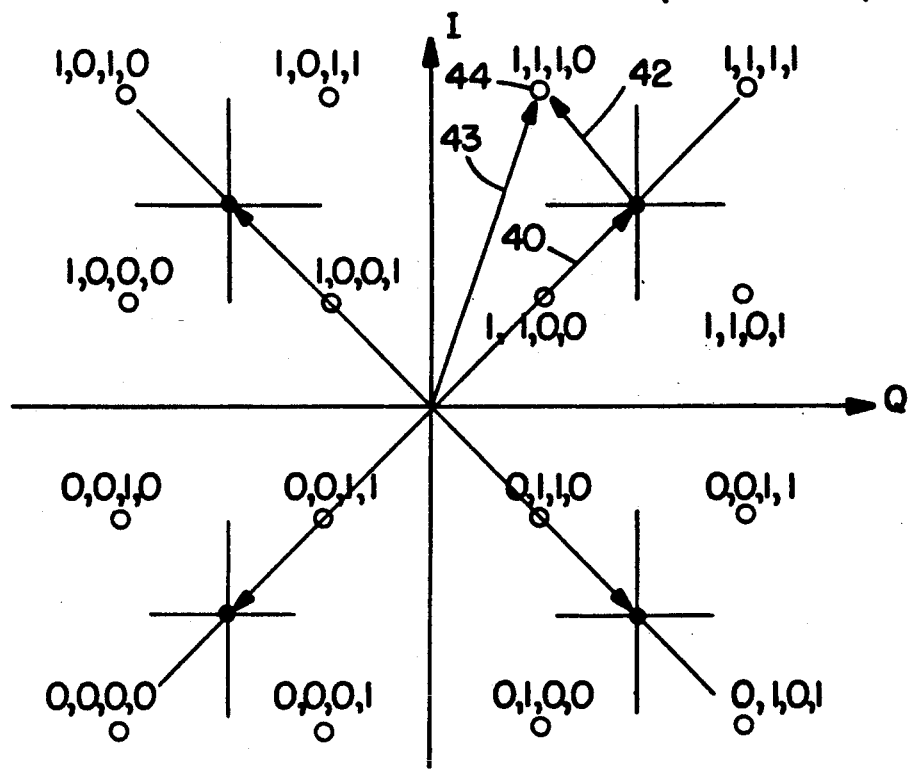
FIG. 4 is a phase-vector plot illustrating the 16 constellation points that are produced by the operation of the modulator of FIG. 3.
Figure 5:
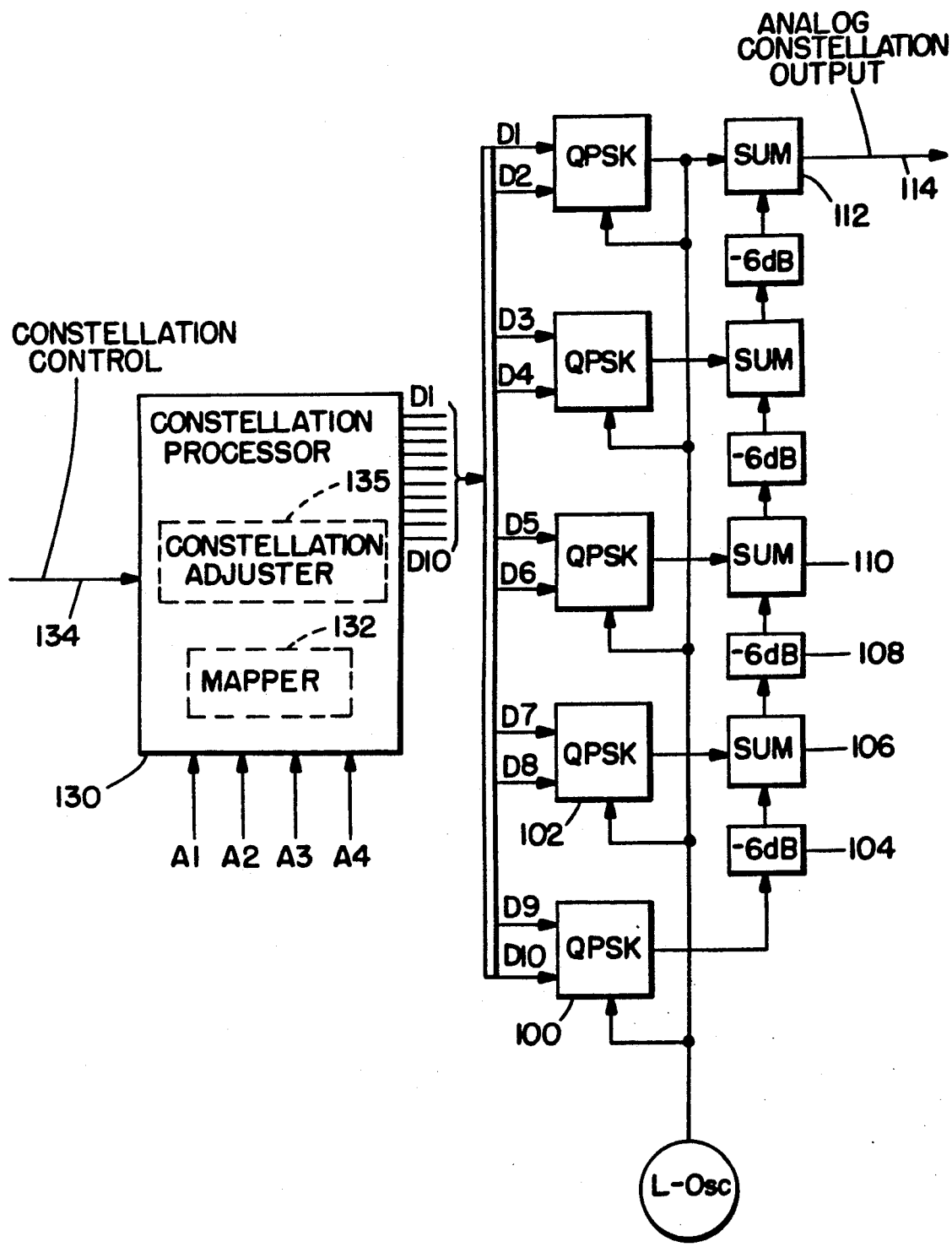
FIG. 5 is a block diagram of a system for converting digital signals to phase shifted periodic analog signals, constructed in accordance with the invention.

The modulator shown in FIG. 5 builds upon the prior art modulator shown in FIG. 3. The number of QPSK modulators that comprise the circuit of FIG. 5 are determined by the precision required of the output constellation. For purposes of explanation, five QPSK modulators are shown which enable a potential constellation of 1024 possible phase-amplitude states ($2^{10}$). Each QPSK modulator is controlled by two binary inputs, with a ten bit binary word D1-D10 controlling the entire modulator.

Each QPSK modulator is capable of outputting a local oscillator signal with one of 4 phase states. Thus, QPSK modulator 100, in accordance with the states of bits D9 and D10, will produce one of 4 phase outputs. In a similar manner, QPSK modulator 102 will produce (in dependence upon the states of bits D7 and D8) a local oscillator frequency signal having one of 4 phase states. The output of QPSK modulator 100 is passed through a 6 dB attenuator and is summed (vectorially) in summing circuit 106 with the output from QPSK modulator 102. The result is passed through 6 dB attenuator 108 to summing circuit 110 and the procedure is repeated until the last of the summing circuits is reached (i.e., summing circuit 112). The resulting output on line 114 includes a signal having a phase-amplitude state constellation that results from a combination of the summed outputs of all the QPSK modulators, in accordance with the states of data input bits D1-D10.

Four binary inputs A1-A4 are applied to a constellation processor 130. It is to be understood that binary inputs A1-A4 are selected merely for explanation purposes and other numbers of binary inputs may be used to control the operation of the circuit of FIG. 5. A constellation control input 134 is applied to constellation processor 130 and controls which of 1024 possible bit states of digital outputs D1-D10 are addressed in a mapper 132 by various states of inputs A1-A4.

As is known, binary values on inputs A1-A4 can exhibit any one of 16 separate digital bit patterns. Each bit pattern causes constellation processor 130 to address a particular set of bits D1-D10 in mapper 132 (in accordance with a command on input 134). The selected states of bits D1-D10 control the operation of the QPSK modulators to provide a particular phase amplitude signal state on output line 114. Thus, the 16 states that can appear on input lines A1-A4 cause 16 (of a possible 1024) separate bit states on output lines D1-D10.

Figure 6:
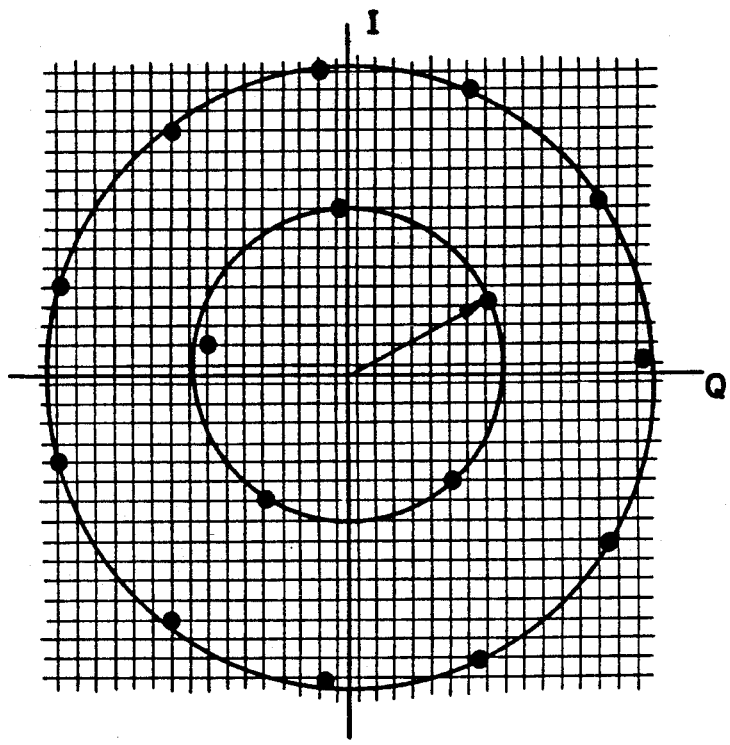
FIG. 6 is a plot of the constellation of points in phase space produced by the circuit of FIG. 5, further illustrating 16 points in the constellation that are selected in accordance with 16 possible states of a four bit control input.

In FIG. 6, a plot shows the 32×32 constellation of phase amplitude vector points that can be generated by the circuit of FIG. 5. Each vector originates at the intersection of the I/Q axes and proceeds to an intersection of the grid plotted on the graph. 16 separate points in the constellation are illustrated to enable visualization of the analog phase values that are created (in this example) from digital inputs A1-A4. By altering the commands on constellation control input 134, processor 130 can be caused to change the matching of the states on inputs A1-A4 to the states of D1-D10 in mapper 132. Thus, in the event of non-linear distortion on output line 114 (or a transmission element connected thereto), the analog outputs thereon (corresponding to inputs A1-A4) may be rearranged so that they compensate for the expected distortions. Such "rearrangement" is accomplished by a constellation adjuster function 135 in constellation processor 130. The operation of adjuster function 135 will be further explained in the discussion of FIG. 7.

In summary, the quadrature phase shift keyers shown in FIG. 5 are capable of providing analog outputs with any of 1024 phase relationships. Those phase/amplitude relationships are controlled by digital values appearing on inputs D1-D10. The specific binary values emplaced on inputs D1-D10 are controlled by constellation processor 130 in accordance with a constellation control input 134 and the contents of mapper 132. Thus, the 16 states of inputs A1-A4 can be matched to any of 16 of the 1024 values of D1-D10 and cause corresponding analogue phase outputs to be placed on line 114.

Figure 7:
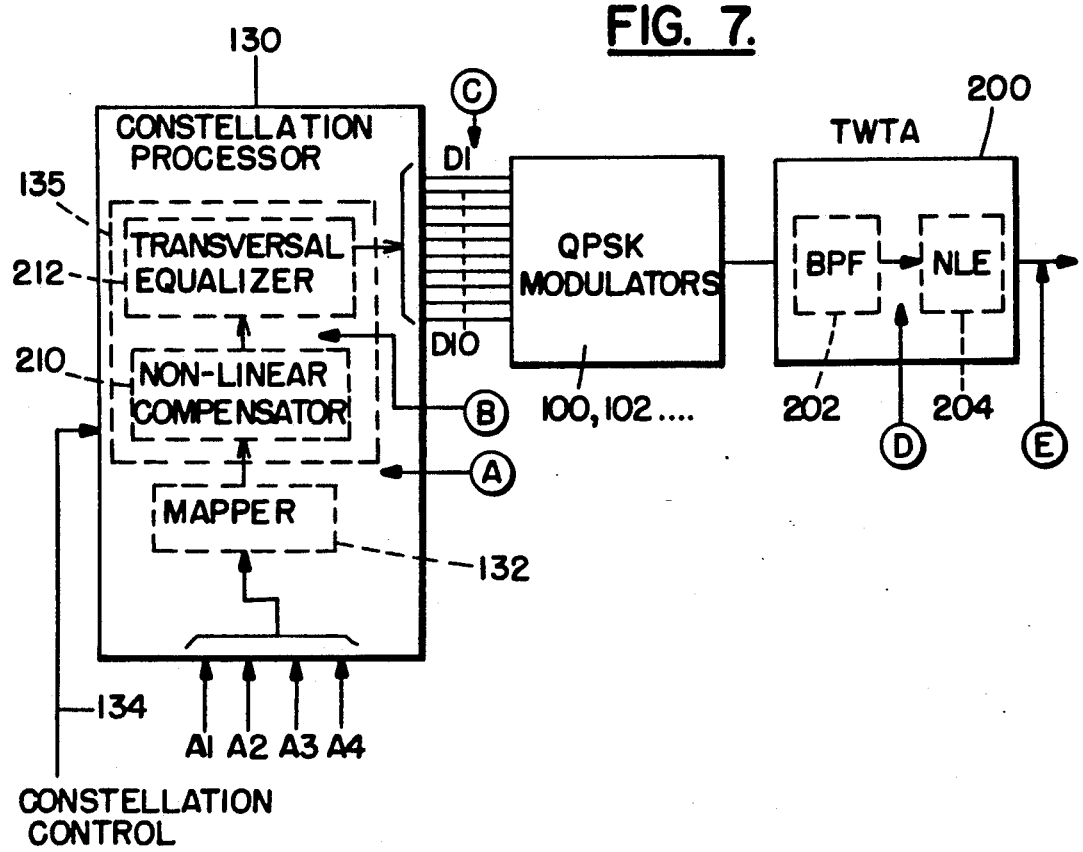
FIG. 7 shows the circuit of FIG. 5 in combination with a non-linear transmission element.

In FIG. 7, the system of FIG. 5 is shown employed in combination with a non-linear transmission element, in this case, a schematically shown traveling wave tube amplifier (TWTA) 200. TWTA 200 can be modeled as a bandpass filter (BPF) 202 followed by a non-linear element (NLE) 204. The system's objective is to suppress intersymbol interference at the input to NLE 204, since once NLE 204 acts upon a signal corrupted by significant intersymbol interference, the resulting performance degradation (bit error rate vs. signal-to-noise ratio) is largely unrecoverable.

Figure 8A:
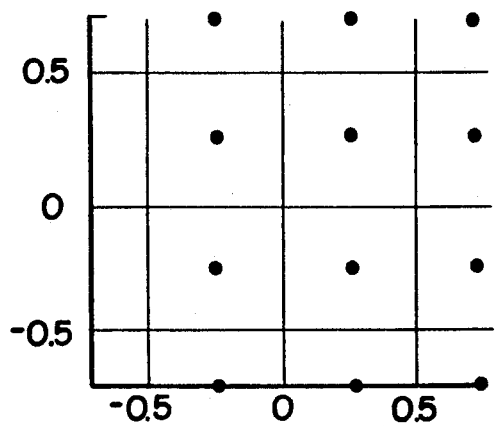
FIGS. 8A-8E show representative phase/amplitude constellations at various points in the circuit of FIG. 7.
Figure 8B:
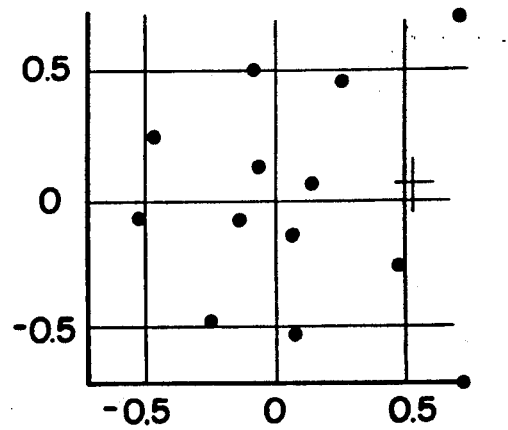

Within constellation processor 130 is shown three functions that enable the generation of a properly oriented constellation to overcome transmission non-linearities of TWTA 200. Mapper 132, as aforedescribed, provides an initial mapping of inputs A1-A4 to a vector defined by one constellation point in a regular 16 QAM constellation (for example), such as shown in FIG. 8A. The resulting digital phase and amplitude of the chosen vector is fed to a constellation adjuster function 135 that includes a non-linear compensation function 210 and a transversal equalizer 212. Non-linear compensation function has been pre-loaded to enable it to adjust the output from mapper 132 to compensate for the non-linearities to be experienced in NLE 204 (such as AM/AM and AM/PM distortion). More specifically, non-linear compensation function 210 modifies the phase and amplitude of the phase vector from mapper 132 so as to complement the expected effects of NLE 204. A representative altered constellation output from non-linear compensation function 210 is shown at FIG. 8B.

The output from non-linear compensation function 210 is fed to a transversal equalizer 212 (e.g., a finite impulse response filter) to enable the inputs to NLE 204 to have minimal intersymbol interference. Coefficients and delays within transversal equalizer 212 are selected and pre-loaded in accordance with the transmitted symbol rate and impulse response of BPF 202. In this manner, symbols inputted to NLE 204 have minimum ISI at the ideal sampling instant of the waveform.

Transversal equalizer 212 is only required in cases where the principal spectrum of the output is comparable to the bandwidth of BPF 202, and cases where the impulse response of BPF 202 is comparable to the time duration of a transmission symbol. The response of the system from the input of transversal equalizer 212 to the output of BPF 202 is thus essentially free of inter symbol interference. A representative constellation output from transversal equalizer 212 is shown at FIG. 8C.

Those skilled in the art will realize that the functions of mapper 132 and non-linear compensator 210 may be combined into a single function since the mapping function can map its inputs onto a predistorted map. This mapping function can be implemented as a RAM lookup table. Thus, in situations where the characteristics of NLE 204 are subject to drift due to component ageing or other causes, the table can be adapted accordingly.

Figure 8C:
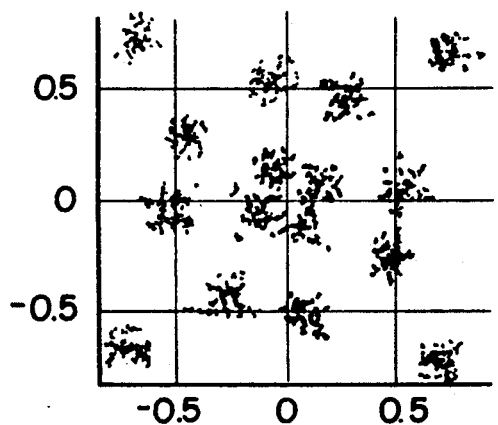
Figure 8D:
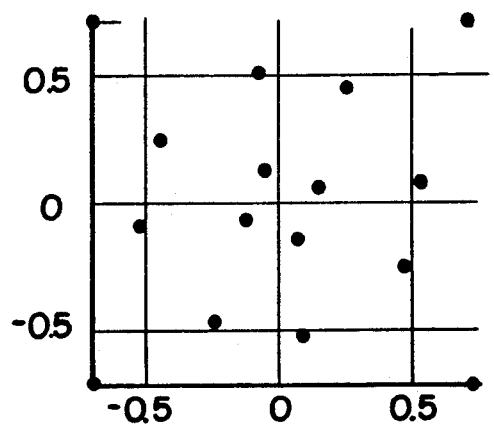

FIGS. 8A-8E show constellations corresponding to points A-E of FIG. 7. An example constellation, i.e, a 16 QAM, is given in FIG. 8A. After the action of non-linear compensator 210, the constellation of FIG. 8B results and no longer resembles a conventional 16 QAM. The transversal equalization injects intersymbol interference and the constellation of FIG. 8C is the result. After passing through the bandshape distortion of BPF 200, constellation D results (FIG. 8D). Note that most of the ISI is removed.

Figure 8E:
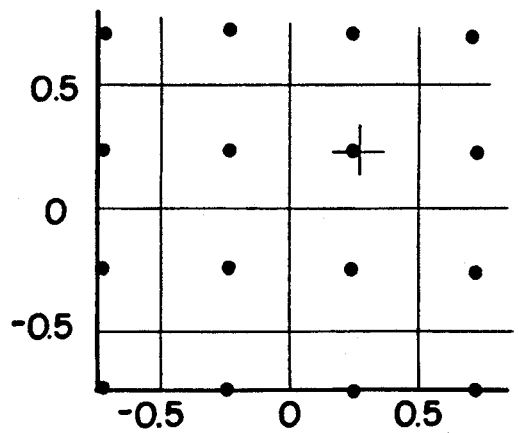
Figure 9A:
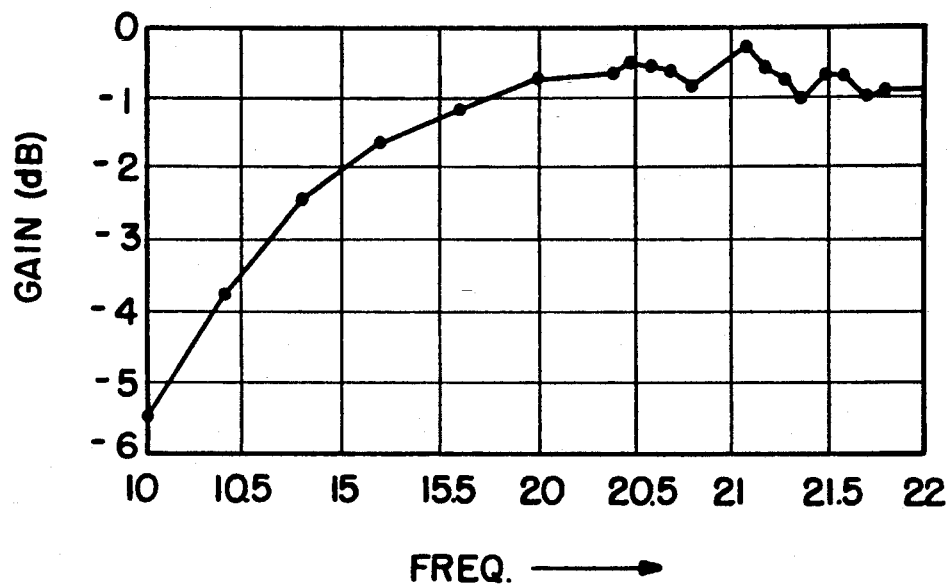
FIGS. 9A and 9B show representative amplitude/phase responses for a traveling wave tube amplifier, used to obtain the constellations of FIGS. 8A-8E.
Figure 9B:
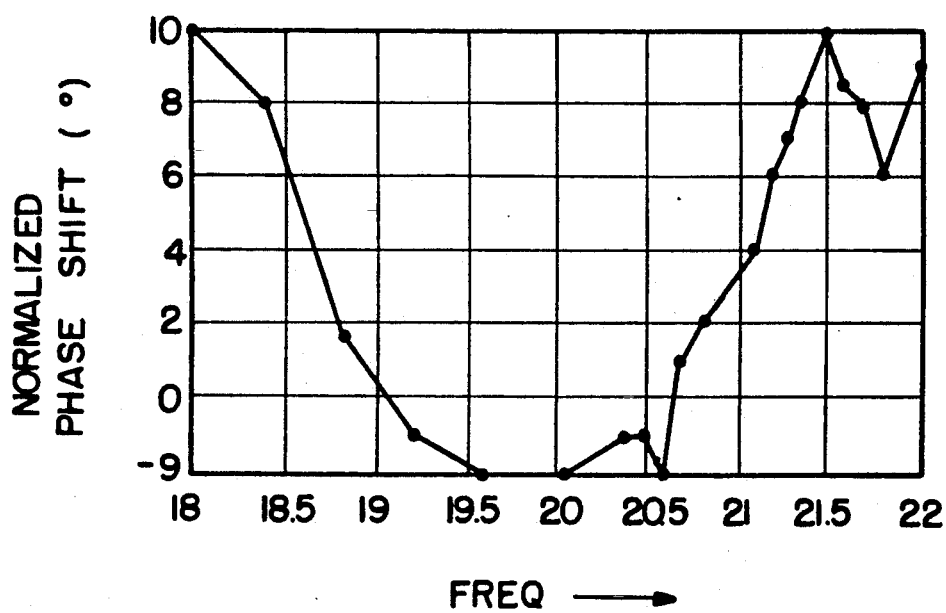
Figure 10A:
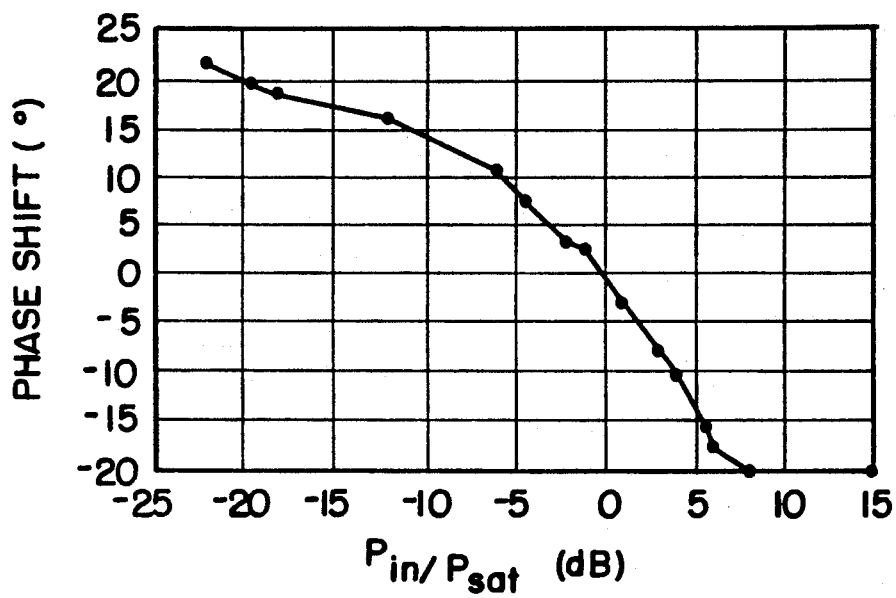
FIGS. 10A and 10B show representative AM/PM and AM/AM distortions for a traveling wave amplifier, used to obtain the constellations of FIGS. 8A-8E.
Figure 10B:
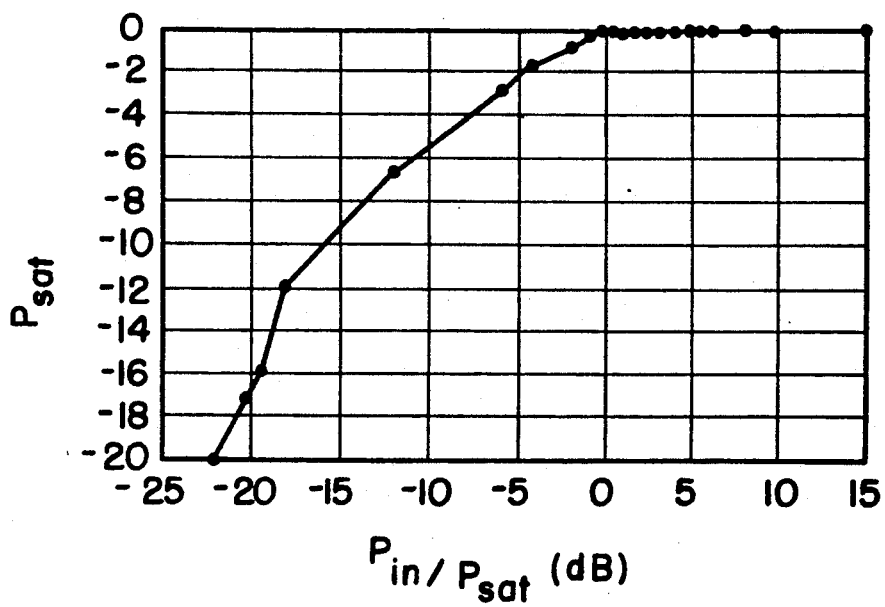

Finally the TWTA non-linear distortions in NLE 204 reverse the previously forced constellation distortions and a familiar 16 QAM constellation appears (FIG. 8E). Some residual constellation spreading is apparent, particularly in the inner states attributable to imperfect transversal equalization compensation of BPF 202. This results from non-linear distortion operating on the non-fully equalized constellation at D, coupled with the higher gain for the inner states (small signals in the TWTA) compared with a lower gain for the outer states (nearing TWTA saturation).

It must be recognized that point D does not physically exist, but is a conceptual interface in the hypothetical TWTA model. The non-linearities and bandshaping of TWTA 200 that were used in deriving the constellations of FIGS. 8A-8E are shown in FIGS. 9A, 9B, 10A and 10B.

It should be understood that the foregoing description is only illustrative of the invention. Various alternatives and modifications can be devised by those skilled in the art without departing from the invention. For instance, compensation for time dispersive elements in the transmission medium (filters, propagation media) may be performed by combining successive data words (A1-A4) with appropriate digitally controlled combining coefficients to create "conjugate" intersymbol interference. This interference and the resulting signal at the medium output has far less intersymbol interference. The result is that the signal thus processed, exhibits a lower overall probability of bit error in the presence of medium induced noise than if this "conjugate" intersymbol interference was not included. Accordingly, the present invention is intended to embrace all such alternatives, modifications and variances which fall within the scope of the appended claims.

I claim:

1. An adaptive system for converting input digital signals to phase and amplitude adjusted periodic signals for passage to a transmission means, said system comprising:

a plurality of quadrature phase shift keying modulators, each modulator connected to a common oscillatory means and having a plurality of digital state inputs, the states of said inputs determining which of a plurality of quadrature phase displaced signals will be outputted;

means for vectorially summing the outputs of said modulators so as to enable production of a constellation of phase and amplitude displaced outputs;

mapping means for matching a set of digital signal inputs to a different set of digital states, said digital states connected as controlling inputs to said quadrature phase shift keying modulators, said mapping means storing a plurality of sets of digital states, said plurality greater in number than that required to represent just said digital signal inputs; and processor means responsive to control inputs to enable a said set of digital signal inputs to cause said mapping means to output a set of digital states in accordance with said control inputs, said processor means responsive to said control inputs to enable selection of any of a plurality of sets of digital states by said set of digital signal inputs, said vectorial summing means producing phase and amplitude displaced signals in accordance with said digital states.

2. The adaptive system as recited in claim 1 wherein said control inputs cause said processor means to enable selection of said digital states from said mapping means by said digital signal inputs in accordance with signal transmission characteristics of said transmission means.

3. The adaptive system as recited in claim 2 wherein said processor means selects said digital states in response to said control inputs so as to cause a periodic signal to be output from said vectorial summing means, said periodic signal altered in phase and amplitude to compensate for the transmission characteristics of said transmission means.

4. The adaptive system as recited in claim 3 wherein said processor means includes adjustment means responsive to said control inputs to alter said selected digital states so as to modify a periodic signal phase and amplitude generated by said quadrature phase shift keying modulators and said vectored summing means, said modified periodic signal, when subjected to said transmission characteristics of said transmission means, converted to a periodic signal having desired phase and amplitude characteristics.

5. The adaptive system as recited in claim 4 wherein said adjustment means comprises compensation means for adjusting digital state outputs from said mapping means so as to compensate for non-linear transmission characteristics of said transmission means.

6. The adaptive system as recited in claim 4 wherein said adjustment means comprises a transversal equalizer filter function for adjusting digital state outputs from said mapping means to minimize intersymbol interference resulting from transmission characteristics of said transmission means.

7. The adaptive system as recited in claim 1 wherein said means for vectorially summing the outputs of said modulators comprises a plurality of summing circuits, each summing circuit connected between an output of a quadrature phase shift keying modulator and an output of another quadrature phase shift keying modulator, which latter output has been attenuated by six dB.

8. A method for adaptively converting digital signals to phase and amplitude shifted carrier signals, said method comprising the steps of:
   (a) converting a plurality of pairs of digital signals to quadrature phase shifted carrier signals;
   (b) attenuating one said quadrature phase shifted carrier signal and vectorially summing it with a non-attenuated quadrature phase shifted carrier signal;
   (c) attenuating said vectorial sum from step (b) and combining it with another said quadrature phase shifted carrier signal;
   (d) repeating steps (b) and (c) until a last summed output appears at an output; and
   (e) controlling states of said pairs of digital signals in accordance with control signals and additional digital inputs so as to enable a plurality of said additional digital inputs to produce digital signals in conformance with said control signals, there being more values of said controlling states of said pairs of digital signals than are required to represent said additional digital inputs.

9. The method as recited in claim 8 wherein said control signals are indicative of a state of a transmission facility over which said phase and amplitude shifted carrier signals will traverse and cause a modification of said digital signals in accordance with said transmission facility state.

10. The method as recited in claim 9 wherein said modification of said pairs of digital signals causes a phase and amplitude shift of said carrier signal which, after experiencing said transmission facility, is altered to exhibit desired phase and amplitude characteristics.

* * * * *

UNITED STATES PATENT AND TRADEMARK OFFICE
CERTIFICATE OF CORRECTION

PATENT NO. : 5,237,292
DATED : August 17, 1993
INVENTOR(S) : Chethik

It is certified that error appears in the above-indentified patent and that said Letters Patent is hereby corrected as shown below:

On the title page, after "Assignee" delete "Space Systems/Loral" and insert --Loral Aerospace Corporation--.

Signed and Sealed this

Tenth Day of May, 1994

Attest:

BRUCE LEHMAN

*Attesting Officer*     *Commissioner of Patents and Trademarks*